United States Patent [19]
Benitez

[11] 4,321,185
[45] Mar. 23, 1982

[54] INK SYSTEM

[75] Inventor: Osiel H. Benitez, Henrico County, Va.

[73] Assignee: Reynolds Metals Company, Richmond, Va.

[21] Appl. No.: 255,878

[22] Filed: Apr. 20, 1981

Related U.S. Application Data

[63] Continuation of Ser. No. 160,862, Jun. 19, 1980, abandoned.

[51] Int. Cl.³ ............................................. C08L 75/06
[52] U.S. Cl. ................................... 524/363; 525/440; 524/364
[58] Field of Search .................... 260/31.8 M, 32.8 N, 260/33.6 UB, 40 R, 37 N; 528/80, 83, 84; 525/440, 444

[56] References Cited

U.S. PATENT DOCUMENTS

| | | | |
|---|---|---|---|
| 1,592,082 | 7/1926 | Courtney | 260/31 |
| 2,220,621 | 11/1940 | Ellis | 260/31 |
| 2,631,986 | 3/1953 | Schmutzler | 260/31 |
| 3,136,681 | 6/1964 | Johnson | 260/32.8 R |
| 3,481,891 | 12/1969 | Boylan et al. | 260/31 |
| 3,718,623 | 2/1973 | Lohse et al. | 525/440 |

*Primary Examiner*—J. Ziegler
*Attorney, Agent, or Firm*—Lyne, Girard & McDonald

[57] ABSTRACT

An ink system, especially for use in retort environments, is disclosed. The ink system comprises a hard polyester resin, a soft polyester resin, a polyisocyanate catalyst and an appropriate pigment or pigments.

12 Claims, No Drawings

INK SYSTEM

This application is a continuation of Ser. No. 160,862, filed June 19, 1980, now abandoned.

BACKGROUND OF THE INVENTION

Numerous ink systems are available in the marketplace. These systems are often designed for specific utilities.

A fairly recently introduced concept to the packaging industry is the use of retort pouches for medical implements, foodstuffs and the like. These pouches are formed from a pair of lamina. Each lamina comprises a pair of plastics resin film layers sandwiching and adhered to a metallic foil layer, such as aluminum foil. Thus, the contents within the pouch cannot be seen, and suitable labeling is often required.

Many ink systems are available which successfully print on plastics resin films, such as polyester films. However, most ink systems which successfully print on plastic resin film layers cannot withstand the heat of retort sterilization, which normally takes place at approximately 250° F. (121.1° C.) or higher, or if the ink system is able to withstand the retort operation, the ink system blocks severely when a printed roll of film is stored. The term "blocking" refers to the tendency for the ink to adhere to a surface against which it comes into contact, other than the surface it was printed onto. Thus, when a printed roll of film is coiled, blocking refers to the tendency for the ink to adhere to successive layers of the film which have been coiled on top of the printed layer.

THE PRESENT INVENTION

By means of the present invention, an ink system which can both withstand the retorting process and which is nonblocking is provided. The ink system comprises a soft polyester resin, a hard polyester resin, a polyisocyanate catalyst and a pigment or pigments. The ink system of the present invention may be reverse printed on plastics resin film, such as polyester film, and laminated between the plastics resin film and a metallic foil layer in the production of a printed pouch.

DETAILED DESCRIPTION OF THE PREFERRED EMBODIMENTS

The ink system of the present invention is based upon the combination of a hard polyester resin and a soft polyester resin. As used herein, the term "hard polyester resin" refers to a polyester resin having a glass transition temperature of 32° F. (0° C.) and above, and the term "soft polyester resin" refers to a polyester resin having a glass transition temperature below 32° F. (0° C.).

The hard polyester resin helps provide the nonblocking properties to the finished ink at room temperature. The soft polyester resin provides adhesiveness and flexibility to the ink.

The ratios for the hard and soft polyester resins may range from about 35% hard and 65% soft to about 45% hard and 55% soft, solids by weight. Preferably, this ratio is about 40% hard polyester resin and 60% soft polyester resin, solids by weight.

Typical of the hard polyester resins which may be employed is Bostik 7942, and typical of the soft polyester resins which may be employed is Bostik 7260. Bostik 7942 is provided in a solid form and has a melting point of about 248°–284° F. (120°–140° C.) using the ball-and-ring method while Bostik 7260 is provided as 30% solids in methyl ethyl ketone and has a glass transition temperature of 26.4° F. (−10° C.).

The third key element of the ink system of the present invention is a polyisocyanate catalyst. This catalyst is provided in about 1–10% by weight, preferably 2–6% by weight, of the base ink. The polyisocyanate catalyst crosslinks with the polyesters, providing improved adhesion and heat resistance to the resulting ink system.

Typical of the polyisocyanate catalysts which may be employed is Boscodur #1, which is provided as 65–68.5% solids in toluol and ethyl acetate and which includes 11.5–14% isocyanate in the form of toluene diisocyanate.

The polyester resin system is dissolved in a solvent system. This solvent system is preferably a combination of methyl ethyl ketone and toluol. The methyl ethyl ketone reduces the viscosity of the ink, while the toluol lowers the evaporation rate of the ink and increases printability of the ink. The toluol may be present in an amount from about 40–50% by weight of the total solvent, and the methyl ethyl ketone from about 50–60% by weight of the total solvent.

Additionally, methyl normal propyl ketone may be employed as an additional solvent in an amount up to about 50% by weight of the total solvent. Methyl normal propyl ketone also improves the printability of the ink system and lowers the evaporation rate of the ink, while additionally providing increased solubility for the polymers.

The ink color is provided by a pigment or pigments which can be any pigment or pigments having heat resistant properties to withstand retorting. Examples of suitable pigments include titanium dioxide, carbon black, BON red, Red Lake C, Yellow HR, phthalo blue, phthalo green and the like. The pigment or pigments may be provided in an amount from about 6.5–60% by weight on a solids basis depending upon the intensity of the color required.

EXAMPLE

In accordance with the present invention, the following ink was prepared.

| Ingredient | Parts by weight |
| --- | --- |
| pigments- Yellow HR | 3.3 |
| BON red | 0.4 |
| soft polyester-Bostik 7260 −30% solids in methyl ethyl ketone | 45.7 |
| hard polyester-Bostik 7942 −100% solids | 9.2 |
| methyl ethyl ketone | 12.0 |
| toluol | 29.4 |
| TOTAL | 100.0 |

To 100 parts by weight of the above ink composition was then added 3 parts by weight of toluene diisocyanate in the form of Boscodur #1.

The above ink was reverse printed onto a polyester film which was electrostatically treated to 54–56 dynes per linear inch prior to coating. The printed film, when stored as a coil, showed no tendency for the ink to block.

This film coil was then laminated by means of a polyester adhesive on the printed side to an aluminum foil, which foil was in turn laminated to a polypropylene layer. A pair of these laminates were then heat sealed to one another to form a pouch, with the pouch being filled with foodstuffs, sealed and retorted. The ink system withstood the retort operation without degradation, running or other failure.

From the foregoing, it is clear that the present invention provides an ink system which is both nonblocking and which can withstand the retort sterilization process.

While presently preferred embodiments of the invention have been illustrated and described, it will be understood that the invention may be otherwise embodied and practiced within the scope of the following claims.

I claim:

1. An ink system comprising a pigment, a first polyester resin, said first polyester resin having a glass transition temperature of 32° F. (0° C.) and above, a second polyester resin, said second polyester resin having a glass transition temperature below 32° F. (0° C.), a polyisocyanate catalyst and a solvent system comprising methyl ethyl keytone and toluol, said polyester resins being dissolved in said solvent system.

2. The ink system of claim 1 wherein said first polyester resin comprises about 35 to 45% by weight of the total polyester resin and said second polyester resin comprises about 55 to 65% by weight of the total polyester resin.

3. The ink system of claim 2 wherein said first polyester resin comprises about 40% by weight of the total polyester resin and said second polyester resin comprises about 60% by weight of the total polyester resin.

4. The ink system of claim 2 wherein said polyisocyanate catalyst is present in an amount between about 1 to 10% by weight.

5. The ink system of claim 3 wherein said polyisocyanate catalyst is present in an amount between about 1 to 10% by weight.

6. The ink system of claim 4 wherein said polyisocyanate catalyst is present in an amount between about 2 to 6% by weight.

7. The ink system of claim 5 wherein said polyisocyanate catalyst is present in an amount between about 2 to 6% by weight.

8. The ink system of claim 4 wherein said polyisocyanate catalyst is toluene diisocyanate.

9. The ink system of claim 5 wherein said polyisocyanate catalyst is toluene diisocyanate.

10. The ink system of claim 1 wherein said solvent system comprises about 40 to 50% by weight toluol and about 50 to 60% by weight methyl ethyl ketone.

11. The ink system of claim 10 wherein up to about 50% by weight of said solvent system is methyl normal propyl ketone.

12. The ink system of claim 1 wherein said pigment is present in an amount between about 6.5 to 60% by weight of said ink system, on a solids basis.

* * * * *